(12) United States Patent
Omura

(10) Patent No.: US 9,238,761 B2
(45) Date of Patent: Jan. 19, 2016

(54) ADHESIVE COMPOSITION

(71) Applicant: OMURA CONSULTING GMBH, Zurich (CH)

(72) Inventor: Sachikazu Omura, Zurich (CH)

(73) Assignee: OMURA CONSULTING GmbH, Zurich (CH)

( * ) Notice: Subject to any disclaimer, the term of this patent is extended or adjusted under 35 U.S.C. 154(b) by 194 days.

(21) Appl. No.: 14/071,041

(22) Filed: Nov. 4, 2013

(65) Prior Publication Data

US 2014/0148532 A1    May 29, 2014

(30) Foreign Application Priority Data

Nov. 29, 2012 (EP) ..................... 12008026

(51) Int. Cl.
*C09J 11/06* (2006.01)
*C09J 11/08* (2006.01)
*C09J 189/00* (2006.01)

(52) U.S. Cl.
CPC *C09J 11/06* (2013.01); *C09J 11/08* (2013.01); *C09J 189/00* (2013.01)

(58) Field of Classification Search
CPC ................ C09J 11/06; C09J 189/00
See application file for complete search history.

(56) References Cited

U.S. PATENT DOCUMENTS

| 5,407,980 | A |   | 4/1995  | Pizzi et al. |         |
|-----------|---|---|---------|--------------|---------|
| 5,433,863 | A | * | 7/1995  | Braden et al.| 210/708 |
| 5,532,330 | A |   | 7/1996  | Pizzi et al. |         |
| 5,684,109 | A | * | 11/1997 | Chen et al.  | 527/400 |
| 2003/0158297 | A1 | * | 8/2003 | Sano et al. | 523/340 |
| 2003/0232895 | A1 | * | 12/2003 | Omidian et al. | 521/99 |
| 2005/0142271 | A1 | * | 6/2005 | Ojima et al. | 426/548 |
| 2005/0142305 | A1 | * | 6/2005 | Kobayashi et al. | 428/32.34 |
| 2006/0039986 | A1 | * | 2/2006 | Okamoto et al. | 424/489 |
| 2009/0274791 | A1 | * | 11/2009 | Mattson et al. | 426/2 |
| 2014/0154808 | A1 | * | 6/2014 | Patel | 436/1 |

FOREIGN PATENT DOCUMENTS

JP    A-2007-2084       1/2007
JP    A-2011-116930     6/2011

OTHER PUBLICATIONS

Morawiecki (Archivum lmmunologiae et Therapiae Experimentalis, 1963, 11, 139-171).*
Pizzi, "A Universal Formulation for Tannin Adhesives for Exterior Particleboard," *Journal of Macromolecular Science: Part A—Chemistry: Pure and Applied Chemistry*, 1981, vol. A16, No. 7, pp. 1243-1250.
Li et al., "Novel wood adhesives from condensed tannins and polyethylenimine," *International Journal of Adhesion & Adhesives*, 2004, vol. 24, pp. 327-333.
Krithiga et al., "In vitro study on biomineralization of biphasic calcium phosphate in biocomposite crosslinked with hydrolysable tannins of *Terminalia chebula*," *Bull. Mater. Sci.*, Jun. 2011, vol. 34, No. 3, pp. 589-594.
Özacar et al., "Studies on Synthesis, Characterization, and Metal Adsorption of Mimosa and Valonia Tannin Resins," *Journal of Applied Polymer Science*, 2006, vol. 102, pp. 786-797.
Extended Search Report issued in European Patent Application No. 12008026.2 dated Jul. 24, 2013.

* cited by examiner

*Primary Examiner* — Liam J Heincer
(74) *Attorney, Agent, or Firm* — Oliff PLC

(57) ABSTRACT

A adhesive composition that includes at least the main components of a hydrolyzable tannin and at least one cationic polymer selected from the group including (poly-)lysine, (poly-)-DL-ornithine, $\epsilon$-poly-ornithine, (poly-)arginine, (poly-)glutamine, (poly-)asparagine, (poly-)histidine, (poly-)proline, putrescine, spermidine, spermine, cadaverine, agmatine, citrulline and mixtures thereof.

14 Claims, No Drawings

ADHESIVE COMPOSITION

The present invention relates to a new adhesive composition and to a method for its preparation.

Adhesive compositions or adhesives are materials used to attach an object to the surface of another object. Such adhesives may be classified into inorganic adhesives and organic adhesives depending on the particular types of their main ingredients.

In the case of synthetic organic adhesives, emission of harmful substances has become a serious problem recently. Such problems are caused by the use of volatile organic solvents and evaporation of unreacted monomers. More particularly, in the case of adhesives for use in interior materials for buildings, strict regulations have been applied to emission of harmful substances, such as formaldehyde.

Since formaldehyde is a suspected carcinogen, there is a high industrial interest in the development of a formaldehyde-free wood adhesive from renewable natural resources. Under these circumstances, glue-, soy bean protein- and tannin-based adhesives have been developed.

The attractiveness of using tannins in wood adhesives can be derived from their similar reactivity and cross linking chemistry with formaldehyde as that found for phenol- and resorcinol-formaldehyde systems.

Tannins are widely present in plants and the term "tannin" is conventionally known as a generic name for a substance that is easily dissolved in water, whose aqueous solution is highly astringent, and which has the property of tanning leather. Chemically, tannin is not a simple substance but an aggregation of complex organic polyphenolic compounds. Generally, tannins are extracted with warm water or hot water as an extraction agent is used as a base agent, and if required, tannin may be further purified with an organic solvent or modified with alkalis or the like. There are two main classes of tannins: hydrolyzable tannins and condensed tannins.

Condensed tannins are found in virtually all families of plants and constitute more than 90% of the total world production of commercial tannins. They are known for their wide distribution in nature, in particular in wood and bark of various trees, and comprise up to 50% of the dry weight of leaves. Condensed tannins are polymerized to generate phlobaphene that is insoluble in water and reacts with aldehyde to become a polymer. Due to this property, condensed tannins, in particular tannin formaldehyde resins have been used as an adhesive or a binder for wood from the latter half of 1960s.

Hydrolyzable tannins, on the other hand, are derivatives that are hydrolyzed by heating with a dilute acid to generate gallic acid (3,4 5-trihydroxyl benzoic acid) (Römpp's Chemistry Lexicon by O.-A. Neumueller, vol. 2, p. 1452, and vol. 6, p. 4121).

In contrast to condensed tannins, which have found wide application for the preparation of adhesives and resins, hydrolyzable tannins have been of rather limited chemical and economical interest due to their lack of macromolecular structure in their natural state, the low level of possible phenol substitution, their low nucleophilicity, limited worldwide production, and higher price. Therefore, there has for a long time existed the assumption that only condensed tannins are suitable for use as adhesives.

Although tannin-based adhesives have been spotlighted as non-toxic natural adhesives (e.g. as described in J. Macromol. Sci. Chem. A16 (7), 1243-1250, 1981) their application has been limited due to their undesired characteristics such as water solubility and requirement of a thermosetting curing agent. In the past, attempts to improve the water resistance of protein- and tannin-based adhesives were made by the addition of a formaldehyde-based curing agent, such as formalin, paraformaldehyde or hexamethylene tetramine (hexamine) or antiseptics to slow down the rate of deterioration.

In U.S. Pat. No. 5,407,980 of Pizzi et al., for instance, tannin is used as an accelerator to speed up the curing process. This patent relates to a liquid adhesive composition for manufacturing plywood for exterior application and teaches that the added formaldehyde or paraformaldehyde is necessary to achieve the required hard gel.

As mentioned above, ill-effects of formaldehyde on human health are well known. Often formaldehyde is released from such adhesives during the manufacturing process and is sometimes even released from composite boards formed using the adhesives over the useful life of the manufactured board.

U.S. Pat. No. 5,532,330 also of Pizzi et al. relates to a liquid heat-curable, formaldehyde-free binding agent comprising a polyflavenoid type tannin and a curing catalyst that is compatible with cellulose containing materials such as wood chips for the production of particle boards. Specifically, silicon dioxide or boric acid are mentioned as curing catalysts that are curable in a weak acid reaction, however, only at relatively high temperatures.

Li et al (K. Li, X. Geng, J. Simonsen, J. Karchesy, International Journal of Adhesion and Adhesives, 24 (2004) 327-333—"Novel wood adhesives from condensed tannins and polyethylenimine") relate to a formaldehyde-free wood adhesive composition of condensed tannin and polyethylenimin, without further additives.

The study of Krithiga et al.: "In vitro study on biomineralization of biphasic calcium phosphate biocomposite crosslinked with hydrolysable tannins of *Therminalia chebula*" relates to the preparation of bone substitute material from biphasic calcium phosphate, gelatin, chitosan and hydrolysable tannins of *Terminalia chebula* extracts. The hydrolysable tannin extracts are used as crosslinking agents, replacing the commonly used glutaraldehydes in order to reduce cytotoxicity.

JP 2007 002 084 relates to an adhesive composition comprising a tannin of plant origin and a natural adhesive, e.g. gelatin. The particles of the adhesive composition have on the surface an insolubilisation agent selected from the group of aldehydes, isocyanates and polyamines. The insolubilisation agent forms a layer which separates the tannin and the natural adhesive However, the above adhesives lack either economic efficiency or practical usability, or they are expensive and/or involve the use of toxic materials. Therefore, there is still a need for adhesives, which are not harmful to the human body, have little water solubility to be used in an aqueous environment, and require no heating upon curing.

It is thus the problem of the present invention to provide a high quality, formaldehyde-free cured adhesive composition from renewable natural resources, which is particularly suited for use on wood based materials and which is applicable as a non-toxic bio-adhesive but strong in adhesion force in the presence of moisture and aqueous environment.

This problem is solved by the adhesive composition according to claim 1 and its preparation according to claim 10. Preferred embodiments are subject of the dependent claims.

The adhesive composition of the present invention comprises at least the following main components:
 a) a hydrolyzable tannin and
 b) at least one cationic polymer selected from the group consisting of (poly-)lysine, (poly-)-DL-ornithine, ε-poly-ornithine, (poly-)arginine, (poly-)glutamine, (poly-)asparagine, (poly-)histidine, (poly-)proline, putrescine, spermidine, spermine, cadaverine, agmatine, citrulline and mixtures thereof.

It has surprisingly been found that an adhesive composition comprising a hydrolyzable tannin and at least one cationic polymer as according to the present invention exhibits a strong adhesion force even in the presence of water and meets the requirements laid down in standard EN 314, Class 1.

Without wanting to be bound by the theory, the cationic polymer and/or the biopolymer are thought to act as crosslinking agents, by means of which the viscosity and the adhesion force of the composition can be regulated.

The adhesive composition of the present invention is not only completely free of toxic substances such as formaldehyde but can further be prepared completely from renewable natural resources.

Thus, the present invention allows for an adhesive composition complying with highest quality standards to be achieved in a very cost-efficient manner.

Given its low or non-toxicity, the adhesive composition of the present invention can promptly be used for making wood based materials such as lumber, plywood, particleboard, and fiberboard and the like, e.g. in the production of furniture or wood-based household products.

Furthermore, thanks to its relatively low viscosity, the adhesive composition has a prolonged pot life, which allows for performing commercial applications. Also, its application and take-up of the moisture content by the substrate is facilitated, which leads to substantially reduced pressing and curing times.

In addition to the hydrolysable tannin and the at least one cationic polymer mentioned above, the adhesive composition of the present invention may comprise further polymers, e.g. biopolymers, such as gelatin. Throughout this application, the term "hydrolyzable tannin" always refers to all possible sources of such hydrolyzable tannins, which encompass various plant resources with tannin without any particular limitations. Examples of preferred plant resources include those plants conventionally used for the extraction of tannin, such as bark and wood of chestnut, Turkish gall, china gall, tara, myrobalan, hydrolyzable tannins from eucalyptus, oak, and the like. In particular, the bark thereof is preferable from the viewpoint of utilization of resources and the high tannin content. In this regard is to be noted that by the term "a hydrolyzable tannin", also mixtures of hydrolyzable tannins are encompassed.

As used in the context of the present invention, "gelatin" is typically defined as a water-soluble, naturally occurring biopolymer derived from collagen, which is the major structural protein in the connective tissue of animal bone and skin. The bio-adhesive nature of gelatin and its non-toxicity for the human body make gelatin highly attractive as material for adhesive production purposes. Examples of gelatin which may be used in the adhesive composition according to the present invention are gelatins extracted for example from bones, tendons, skins, and combs (such as horns) of mammals and bird species such as cow, pig, horse, fowl, and scales and skin of fish. Best results were achieved with gelatin having a porcine or bovine origin. Such a gelatin may be prepared by, for instance, being extracted from the foregoing animals, but in general, a commercially available product can be used. A method for extraction is not limited, and examples of the same include conventionally known acid treatment or alkali treatment.

In the above embodiment of the adhesive composition the concentration of the hydrolyzable tannin is preferably 25 to 45 wt. %, more preferably 25 to 40 wt. %, most preferably 30 wt. %.

Furthermore, in the above embodiment, the concentration of the cationic polymer in the composition is preferably from 1 to 25% by weight (wt. %), more preferably from 3 to 20 wt. %, most preferably from 5 to 15 wt. %, based on the total weight of the adhesive composition. It has been found that by the addition of the cationic polymer, the viscosity of the adhesive composition can be kept low which in turn facilitates its application and results in a prolonged pot life.

The adhesive composition is preferably obtainable by reacting the respective components in the presence of water. However, the reagent solution may also be a preferably non-harmful organic solvent such as ethanol or a mixture of organic solvent with water. For example, an aqueous mixture comprising 5% ethanol may be used.

The cationic polymer in the adhesive composition preferably has a molecular weight [g/mole] in the range of 1 to 150 kDa, preferably 1 to 50 kDa, most preferably 1 to 10 kDa. Specifically, polylysine having a molecular weight of about 4.2 kDa has been found highly suitable, also from an economic point of view since the prize per mole of the polymer generally increases with increasing molecular weight.

The molecular weight of the cationic polymer may be obtained with easiness and high accuracy, by using e.g. SDS-PAGE (Sodium Dodecyl Sulfate-Polyacrylamide Gel Electrophoresis), Ion Association Chromatography, Aqueous GPC in combination with low-angle laser light scattering techniques (GPC-LALLS).

Furthermore, the cationic polymer is preferably (poly)lysine and/or (poly)arginine.

(Poly)lysine can be produced, for instance, by microorganisms or by enzymes. In this regard, all forms of poly(lysine), such as e.g. poly-D-lysine, α-poly-L-lysine or ε-poly-L-lysine, are encompassed. (Poly)lysine is particularly advantageous as it is widely available and easy to store.

According to a further preferred embodiment, the adhesive composition of the present invention comprises the following main components:
a) the hydrolyzable tannin and
b) the cationic polymer
as defined herein, and further comprises as third main component
c) at least one biopolymer selected from the group consisting of gelatin, albumin, casein and mixtures thereof.

The adhesive composition of the above embodiment is particularly preferred since it exhibits a particularly strong adhesion force and meets the requirements laid down in standard EN 314, Class 2.

In the above embodiment, it is further preferred that the composition comprises 0.1 to 20 wt. % of the cationic polymer, more preferably 1 to 15 wt. %, most preferably 3 to 10 wt. %, based on the total weight of the adhesive composition. Due to the presence of the gelatin, the required amount of cationic polymer can be reduced substantially, which in turn reduces the production costs.

Furthermore, in this embodiment the adhesive composition preferably comprises the biopolymer in a concentration of 3 to 25 wt. %, more preferably 5 to 20 wt. %, most preferably 10 to 15 wt. %, based on the total weight of the adhesive composition.

In the above embodiment of the adhesive composition, the concentration of the hydrolyzable tannin is preferably 10 to 40 wt. %, more preferably 15 to 30 wt. %, most preferably 20 wt. %, based on the total weight of the adhesive composition.

It is further particularly preferred that in the above embodiment the adhesive composition the biopolymer is gelatin. Gelatin has the advantage of being cheap, widely available and easy to handle.

In order to measure the strength of a gel or gelatin, the so-called "Bloom test" was developed by O. T. Bloom in 1925. The test determines the weight in grams needed by a probe (normally with a diameter of 0.5 inch) to deflect the surface of the gel 4 mm without breaking it. The result is expressed as Bloom index (grades). It is usually between 30 and 300 Bloom. To perform the Bloom test on gelatin, a 6.67% gelatin solution is kept for 17 hours at 10° C. prior to being tested. Determination of the bloom index is also described in "Standard methods for the sampling and testing of gelatins", Woburn, Mass.: Gelatin Manufacturers Institute of America, 1986.

In accordance with the present invention, the gelatin has a preferred Bloom index of 80 to 200, more preferably of 100 to 200.

Preferred sources of gelatin are animal sources and particularly good results were obtained with gelatins of a porcine or bovine origin as they generally have a Bloom index in the preferred range of the present invention.

It was surprisingly found that the viscosity of the tannin and gelatin alone and of the gelatin-tannin mixture is non-proportional. Best results with regard to the adhesive strength and curing time could be achieved when using gelatin with a viscosity index in the preferred range of 1.8 to 3.3 mPas, more preferably of 2.5 to 3.0 mPas.

Preferred hydrolyzable tannins are chestnut tannin, turkish gall, china gall, tara tannin, oak tannin, myrobalan tannin, or mixtures thereof. These tannins are beneficial from both, an economic and environmental point of view as they are widely available at a fair price. From an ecological point of view, tara tannin is particularly preferred since the tannin is obtained from the fruits of the tara tree (*Caesalpinia spinosa*), which fruits are harvested on a yearly basis and therefore present a 100% renewable tannin source.

According to a preferred embodiment the tannin:cationic polymer ratio in the composition is from 3:0.5 to 3:1.5, most preferably 3:1. This allows for obtaining an adhesive composition with an optimally low viscosity and shorter pressing times.

In case that the adhesive composition comprises as main components a hydrolyzable tannin, at least one biopolymer and at least one cationic polymer as defined herein, the tannin:biopolymer ratio in the composition is preferably from 2:0.5 to 2:2, more preferably from 2:0.5 to 2:1.5, most preferably 2:1.

In this case, it is further preferred that the tannin:cationic polymer ratio in the composition is preferably from 2:0.5 to 2:1.5, most preferably 2:1.

Furthermore, it is preferred that the adhesive composition has a pH of 8 to 12, more preferably 9.5 to 11. Adjustment of the pH allows for adjusting the reactivity of the tannin, and thus the physical properties of the adhesive composition such as curing time and viscosity. In particular, it was found that if the pH is kept in the mentioned range, the viscosity of the adhesive composition is kept low and therefore ideal for application.

The pH can be adjusted by the addition of a base, preferably NaOH, at various stages during the preparation of the components of the adhesive composition. NaOH has the advantage that side-reactions, e.g. the formation of certain metal derivatives which are prone to react with the tannin, are largely prevented.

Preferably, the adhesive composition according to the present invention does not comprise further main components as defined herein. However, it is possible to incorporate additives such as stabilizers, antioxidants, processing aids, binders, and other additives well-known in the art.

The present invention further relates to a method for preparing a two-component adhesive composition comprising as main components at least a hydrolyzable tannin and at least one cationic polymer and for preparing a three-component adhesive composition comprising as third main component at least one biopolymer as defined herein. The adhesive compositions may be prepared as follows:

In a first step i), an aqueous solution (A) of dissolved tannin is prepared. In a second step ii), a basic solution (B) comprising the cationic polymer as defined herein optionally further comprising an aqueous solution of completely dissolved biopolymer is prepared. In a third step iii), the solution (A) and the solution (B) are mixed together, resulting in the adhesive composition.

The method of the present invention allows for a very efficient and straight forward preparation of the two- or three-component adhesive composition of the present invention. In particular, the method is less complex than previous ones, and also requires essentially no handling of dangerous or use of large amounts of harmful materials.

The aqueous solution (A) is preferably prepared by mixing tannic acid and water in a weight ratio of about 50:50.

The mixing step iii) is preferably conducted at a pH of 8 to 12, more preferably 9.5 to 11. The mixing can be conducted at ambient temperature conditions and is preferably conducted at 40° C.

Thanks to the mild conditions and non-toxic materials employed, the method of the present invention presents an easy and fast preparation method for the adhesive composition according to the present invention.

In a further aspect, the present invention also refers to the use of the adhesive composition for commercial use in composite wood production. It can be used for a large range of products in the timber industry, particularly for the production of chipboard panels, fibreboard panels (MDF), plywood, and laminates.

A main advantage achieved by the invention is the low environmental impact of the adhesive composition, also at an industrial level of production as the components are non-toxic and are derived from renewable resources. In view of the finished product, a completely natural composite wood product is obtained, which is particularly suitable for use in places where children or sensitive people are present.

In one embodiment of the use according to the invention, two substrates are bonded together by applying the adhesive composition described herein to at least one surface of one substrate. The surface of a second substrate is then brought together with the surface of the first substrate such that the adhesive composition is located between the surfaces of the substrates and the adhesive composition is cured.

The adhesive composition of the present invention can be applied manually or automatically as normal beads, by spraying, roller coating or by jet-streaming. The quantity of glue applied depends on absorbency and fit of the wood or workpieces and normally ranges between 70 and 280 g/m$^2$, preferably between 100 and 200 g/m$^2$.

In a preferred process for bonding together two separate wood elements, the adhesive composition is applied to at least one surface of one wood element and then the two wood elements are brought together and the adhesive composition located between the surface. The two surfaces are pressed together by using a press, preferably at a pressure of 10 bar.

The temperature of the press can be about 25 to 100° C., preferably of about 85 to 90° C. for at least about 15 minutes and preferably about 15 to 50 minutes, more preferably for about 15 to 30 minutes.

It goes without saying that the adhesive composition of the present invention can also be used for the production of multi-layered chipboards or fiberboards, which consist of several wood plates adhesively bonded together. Between the respective plates, different amounts of the adhesive composition can be used if required. The adhesive composition may be applied onto one plate after another or several plates may be pre-prepared with a layer of the adhesive composition applied before stacking.

In another embodiment, wood chips are mixed with the adhesive composition and subsequently pressed to a chipboard in accordance with generally used procedures in chipboard production.

Besides the aspects described above, the present invention further relates to a kit for preparing a two-component adhesive composition comprising as main components at least a hydrolyzable tannin and at least one cationic polymer as defined herein, wherein the two components are separated from each other.

In addition, the present invention also relates to a kit for preparing a three-component adhesive composition, comprising as main components at least a hydrolyzable tannin, at least one cationic polymer and at least one biopolymer as defined herein, wherein the three components are separated from each other. The components are therefore mixed just prior to applying the mixture to a substrate, which allows for a long storage of the ready to use components.

The components are preferably stored in a nitrogen gas containing environment. In another preferred embodiment only the hydrolyzable tannin is stored in a nitrogen gas containing environment.

Non-limiting examples of one or more other kit components include instructions for use; vials, containers or other storage vessels containing each of components; delivery devices such as syringes, tubing and the like; and/or packaging suitable for safely and conveniently storing and/or transporting the kit. Preferably the instructions for use are a label or package insert, wherein the label or package insert indicates that the adhesive composition components need to be mixed before use.

The present invention is illustrated by way of the following specific examples:

EXAMPLES

Materials

Hydrolyzabie Tannins (all from Silvachimica, Mondovi, Italy):
  Tannic Acid C (Chestnut)
  FNG (Turkish Gall)
  T80 (Tara)
Cationic Polymer:
  Epsylon Polylysine, Zhengzhou Bainafo Bioengineering, Henan, P.R. China, 7.8 mol $NH_2$/kg, 4.2 kDa molecular weight.
Biopolymers: Gelatins
  Nacalai Tesque, Kyoto Japan; Extra Pure Reagent
  Nitta Gelatin, Osaka Japan
    Edible porcine gelatin from pig skin
    Edible bovine gelatin from cow bones
  Italgelatin, Alba, Italy
    Edible porcine gelatin from pig skin (mesh 8)
    Edible bovin gelatin from cow hides (mesh 8)

Preparation Methods
Tannic Acid C (20 wt. %)
  Tannic acid C (powder, 40 g) was mixed with water (40 ml) in a weight ratio of 50:50 and heated in a water bath at 40° C.
Tannic Acid C (30 wt. %)
  Tannic acid C (powder, 60 g) was mixed with water (60 ml) in a weight ratio of 50:50 and heated in a water bath at 40° C.
Biopolymer (15 wt. %)
  Gelatin (30 g, type A from porcine skin) was put in water (60 ml) in a weight ratio of $H_2O$:gelatin=2:1. The gelatin was allowed to swell at room temperature for one hour. Thereafter, the gelatin-water mixture was incubated at 60° C. for one hour and optionally sonicated to completely dissolve. The solution generally had a pH between 5 and 6.
Cationic Polymer (Polylysine 10 wt. %)
  Polylysine (20 g) was added to a pre-prepared basic NaOH solution (0.22 g NaOH per 1 g polylysine in 40 g $H_2O$) and stirred until the polylysine was completely dissolved.
Biopolymer—Polylysine Solution
  Polylysine (20 g) was added to a pre-prepared basic NaOH solution (0.22 g NaOH per 1 g polylysine dissolved in 66.6 g $H_2O$) and stirred until the polylysine was completely dissolved. Gelatin (20 g, type A from porcine skin) was added. The gelatin was allowed to swell at room temperature for one hour. Thereafter, the mixture was incubated at 60° C. for one hour and optionally sonicated to completely dissolve.

The prepared components were ready for immediate use. For conservation, the prepared Tannic acid C was stored under $N_2$.

Adhesive Preparation
  The tannic acid solution was put in a water bath at 40° C. and NaOH (0.185 g NaOH per 1 g Tannin dissolved in water. The amount of water is adjusted to bring the total amount of the solution up to 200 g) was added to adjust the pH to about 10.0. The polylysine solution or the gelatin-polylysine solution was added in small portions and mixed with the tannin solution. A viscous homogeneous dark mixture was obtained.

Gluing Procedure/Board Preparation
  Five Okoumé veneers of 2 mm thickness were glued together to produce a plywood board of 50 cm by 50 cm by applying the adhesive composition on one surface of one veneer, subsequently putting a second veneer (fibers at right angles) or top, applying the second layer of adhesive composition and so on. The stack of 5 veneers was then put in a press at 90° C. and 10 bar for 20 min.

Determination of Adhesion Strength
  The adhesion strength of plywood produced with the adhesive composition according to the invention were examined in accordance with the standard EN314, class 1 test.

The boards were subjected to the following treatments to test the bonding strength:
a) samples were cut to the size of 17 cm by 2.5 cm.
b) grooves were cut into the samples (the resulting testing area being 2.5 by 2.5 cm) in order to test the shear resistance and fiber release of the single adhesion strength of the adhesive between two layers.
c) The samples were put into cold water for 24 h.
d) while being still wet, the samples where then tested for shear resistance and fiber release percentage by pulling using a pulling machine.

Tested Compositions
  For testing the adhesion strength of the adhesives, Compositions A, B and C were prepared comprising the compounds given in Tables I and II below:

TABLE I

|  | Composition A | Composition B | Composition C |
|---|---|---|---|
| tannin | 20 wt. % | 20 wt. % | 30 wt. % |
| gelatin | 15 wt. % | 10 wt. % | — |
| Cationic Polymer (Polylysine) | 0-10 wt. % | 0-10 wt. % | 0-10 wt. % |

TABLE II

| Composition | Experiment No. | Tannin [wt. %] | Gelatin [wt. %] | Polylysine [wt. %] |
|---|---|---|---|---|
| A | 1.1 | 20 | 15 | 10 |
| A | 1.2 | 20 | 15 | 0.1 |
| A | 1.3 | 20 | 15 | — |
| A | 2.1 | 20 | 15 | 10 |
| A | 2.2 | 20 | 15 | — |
| B | 3.1 | 20 | 10 | 10 |
| B | 3.2 | 20 | 10 | 0.1 |
| B | 3.3 | 20 | 10 | — |
| C | 4.1 | 30 | — | 10 |
| C | 4.2 | 30 | — | 1.0 |

For each adhesive composition, 20 plywood samples were subjected to the treatment steps described above for the standard EN314, class 1 test.

In particular, the following parameters were used:
Pressing: at 90° C. for 20 minutes
Composition pH: 10.0

Based on the adhesive strength values X [N/mm] thus determined for each of the 20 samples per composition, the samples were divided into the following 5 categories:
L0: X≥1, i.e. achieving DIN EN 314, Class 1 standards
L1: 1≥X≥0.5
L2: 0.5≥X≥0.2
L3: 0.2≥X≥0.04
L4 and L5: X<0.04

The results are given in table III below:

TABLE III

| Exp. No. | Tannin [wt. %] | Gelatin [wt. %] | Cat. Polymer [wt. %] | time from mix [min] | L0 | L1 | L2 | L3 | L4 | L5 |
|---|---|---|---|---|---|---|---|---|---|---|
| 1.1 | 20 | 15 | 10 | 14' | 2 | 17 | 1 | — | — | — |
| 1.2 | 20 | 15 | 0.1 | 17' | — | — | 2 | 1 | 17 | — |
| 1.3 | 20 | 15 | — | 19' | — | — | — | 1 | 19 | — |
| 2.1 | 20 | 15 | 10 | 81' | 11 | 9 | — | — | — | — |
| 2.2 | 20 | 15 | — | 66' | — | — | 1 | 12 | 7 | — |
| 3.1 | 20 | 10 | 10 | 11' | 5 | 7 | 8 | — | — | — |
| 3.2 | 20 | 10 | 0.1 | 12' | — | — | — | — | 8 | 20 |
| 3.3 | 20 | 10 | — | 32' | — | — | — | 2 | 13 | 4 |
| 4.1 | 30 | — | 10 | 47' | 2 | 10 | 7 | 1 | — | — |
| 4.2 | 30 | — | 1.0 | 31' | — | — | — | — | — | 20 |

The above results clearly indicate that the presence of the cationic polymer in the adhesive composition effects a remarkable increase in the adhesive strength. This advantageous effect appeared to be independent from the presence or absence of a biopolymer, such as gelatin, in the composition.

The invention claimed is:

1. An adhesive composition comprising at least the following main components:
a hydrolyzable tannin and
at least one cationic polymer selected from the group consisting of (poly-)lysine, (poly-)-DL-ornithine, ϵ-polyornithine, (poly-)arginine, (poly-)glutamine, (poly-)asparagine, (poly-)histidine, (poly-)proline, putrescine, spermidine, spermine, cadaverine, agmatine, citrulline and mixtures thereof,
wherein the adhesive composition comprises the hydrolyzable tannin in a concentration of from 25 to 45 wt. % and the cationic polymer in a concentration of from 5 to 25 wt. %, based on the total weight of the adhesive composition.

2. The adhesive composition according to claim 1, wherein the cationic polymer is (poly)lysine and/or poly(arginine).

3. The adhesive composition according to claim 1, wherein the hydrolyzable tannin is chestnut tannin, turkish gall, china gall, tara tannin, oak tannin, myrobalan tannin, or mixtures thereof.

4. The adhesive composition according to claim 1, wherein the adhesive composition has a pH of 8 to 12.

5. The adhesive composition according to claim 1, wherein hydrolyzable tannin is present in a concentration of from 25 to 40 wt. %.

6. The adhesive composition according to claim 1, wherein the cationic polymer is present in a concentration of from 5 to 15 wt. %.

7. A method for preparing a two-component adhesive composition according to claim 1, comprising the steps of
preparing an aqueous solution (A) of dissolved tannin;
preparing a basic solution (B) comprising the cationic polymer, and;
mixing solution (A) and solution (B).

8. A kit for preparing a two-component adhesive composition of claim 1, comprising
a hydrolyzable tannin and
at least one cationic polymer selected from the group consisting of (poly-)lysine, (poly-)-DL-ornithine, ϵ-polyornithine, (poly-)arginine, (poly-)glutamine, (poly-)asparagine, (poly-)histidine, (poly-)proline, putrescine, spermidine, spermine, cadaverine, agmatine, citrulline and mixtures thereof,
wherein the hydrolyzable tannin and the at least one cationic polymer are separated from each other.

9. An adhesive composition, comprising
a hydrolyzable tannin,
at least one cationic polymer selected from the group consisting of (poly-)lysine, (poly-)-DL-ornithine, ϵ-polyornithine, (poly-)arginine, (poly-)glutamine, (poly-)asparagine, (poly-)histidine, (poly-)proline, putrescine, spermidine, spermine, cadaverine, agmatine, citrulline and mixtures thereof, and
at least one biopolymer selected from the group consisting of gelatin, albumin, casein and mixtures thereof.

10. The adhesive composition according to claim 9, comprising 0.1 to 20 wt. % of the cationic polymer based on the total weight of the adhesive composition.

11. The adhesive composition according to claim 9, comprising the at least one biopolymer in an amount of 3 to 25 wt. % based on the total weight of the adhesive composition.

12. The adhesive composition according to claim 9, wherein the at least one biopolymer is gelatin.

13. A method for preparing a three-component adhesive composition according to claim 9, comprising the steps of
preparing an aqueous solution (A) of dissolved tannin;
preparing a basic solution (B) comprising the cationic polymer and the biopolymer dissolved in water, and;
mixing solution (A) and solution (B).

14. A kit for preparing a three-component adhesive composition, comprising
  a hydrolyzable tannin and
  at least one biopolymer selected from the group consisting of gelatin, albumin, casein and mixtures thereof and
  at least one cationic polymer selected from the group of (poly-)lysine, (poly-)-DL-ornithine, $\epsilon$-poly-ornithine, (poly-)arginine, (poly-)glutamine, (poly-)asparagine, (poly-)histidine, (poly-)proline, putrescine, spermidine, spermine, cadaverine, agmatine, citrulline and mixtures thereof,
  wherein the hydrolyzable tannin and the at least one biopolymer and the at least one cationic polymer are separated from each other.

\* \* \* \* \*